April 18, 1950 W. J. WHATLEY 2,504,478
SUPPORT FOR COAXIAL FLUID CONDUITS
Filed Nov. 13, 1945 3 Sheets-Sheet 1
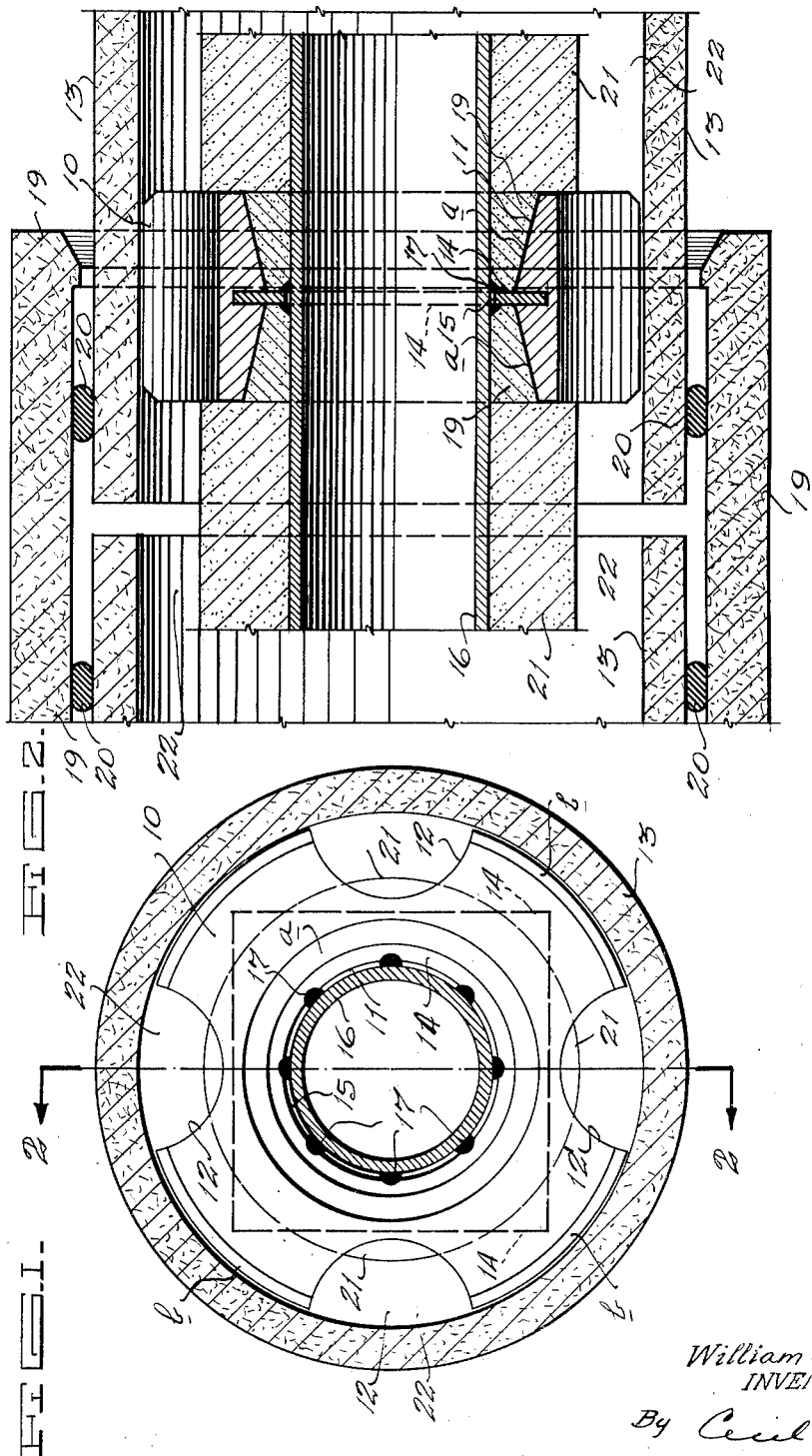
William J. Whatley
INVENTOR
By Cecil L. Wood
ATTORNEY April 18, 1950 W. J. WHATLEY 2,504,478
SUPPORT FOR COAXIAL FLUID CONDUITS
Filed Nov. 13, 1945 3 Sheets-Sheet 2
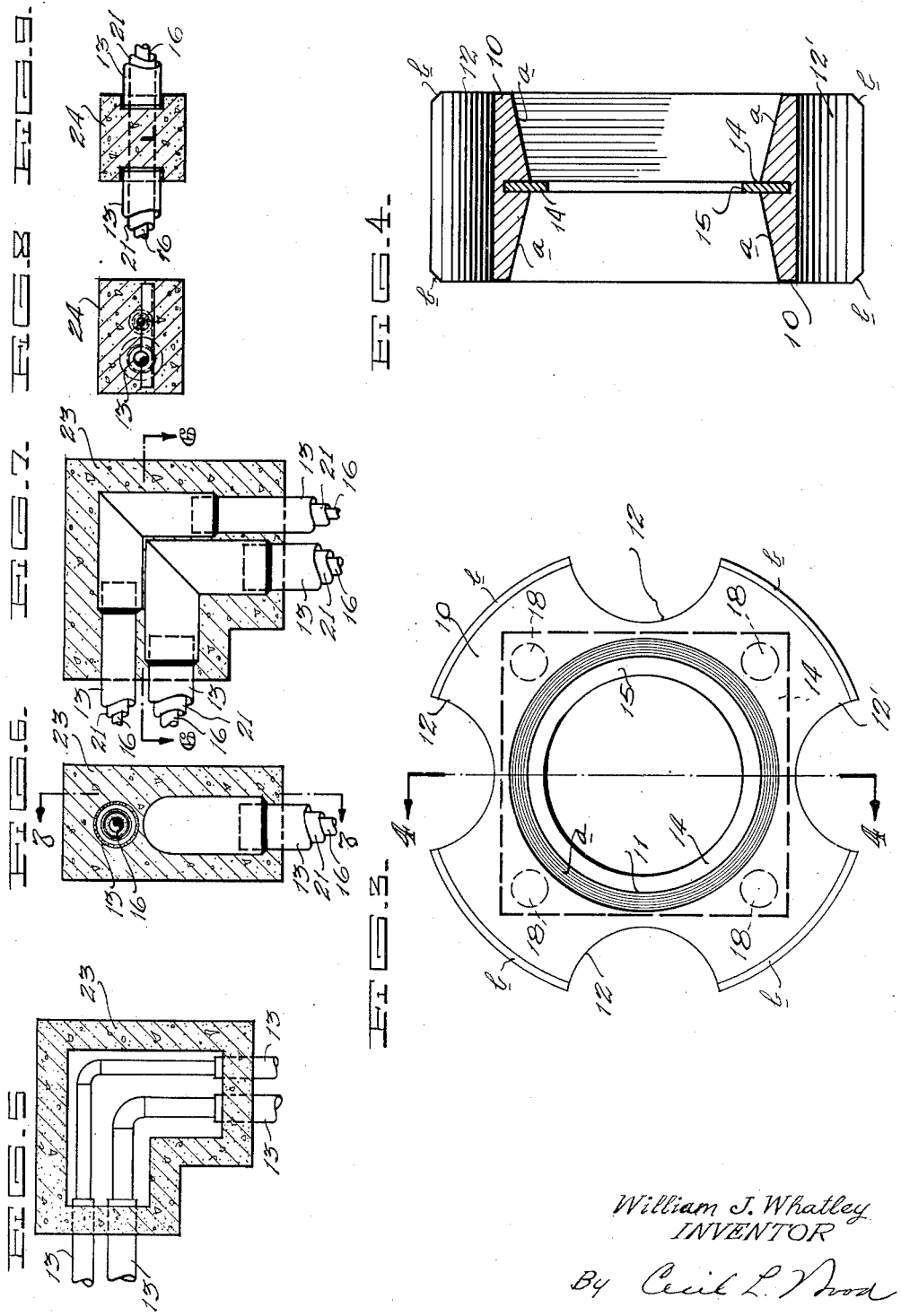
William J. Whatley
INVENTOR
By Cecil L. Wood
ATTORNEY

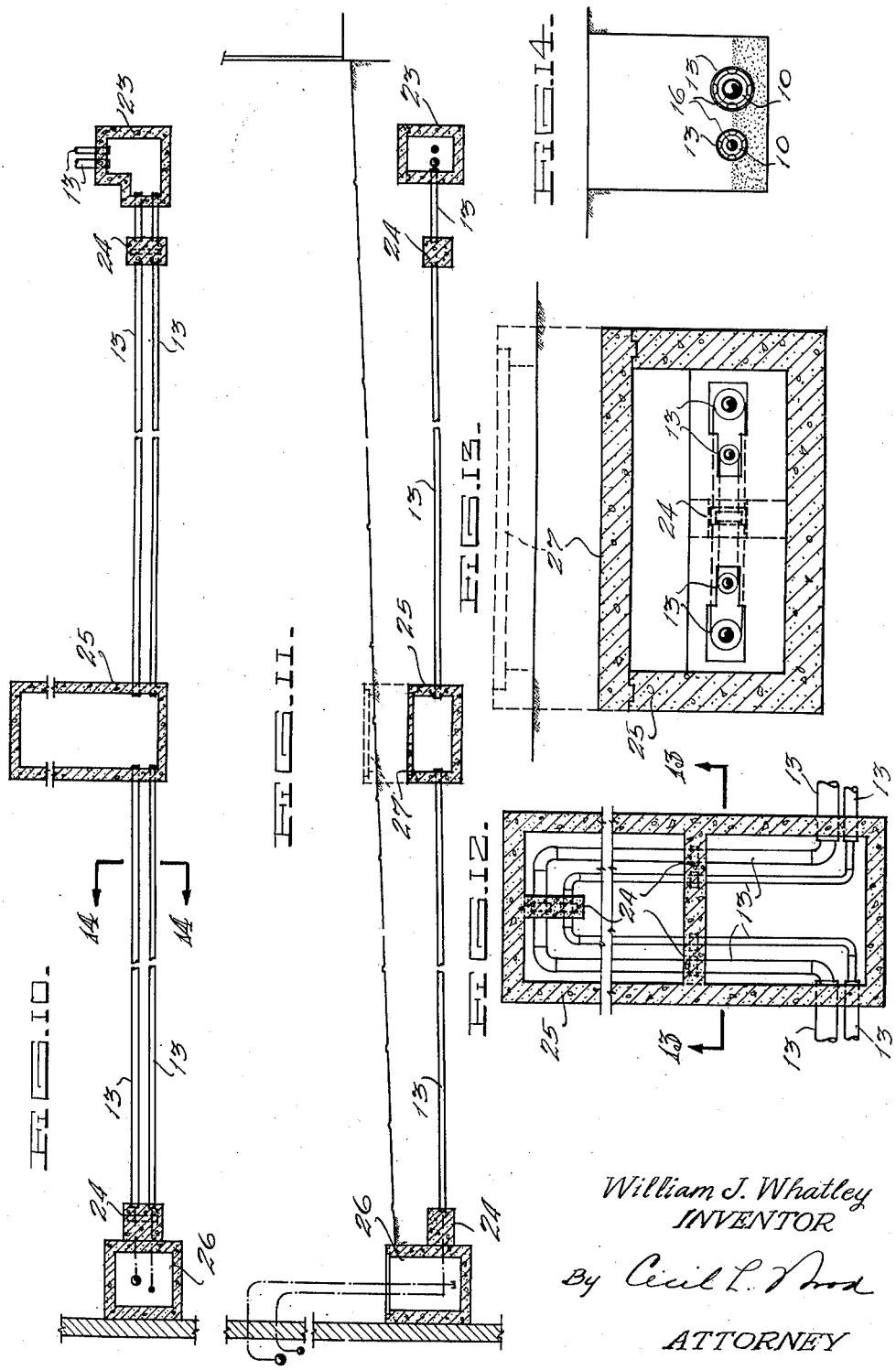

Patented Apr. 18, 1950

2,504,478

UNITED STATES PATENT OFFICE 2,504,478

SUPPORT FOR COAXIAL FLUID CONDUITS

William J. Whatley, Corpus Christi, Tex.

Application November 13, 1945, Serial No. 628,151

6 Claims. (Cl. 138—48)

This invention relates to underground installations of conduits for steam, and other fluids, where proper insulation is required, and it has particular reference to a supporting device for concentrically and slidably supporting a fluid conduit concentrically within a casing, and its principal object resides in the provision of a supporting structure by which a conduit can be coaxially retained within an outer casing to provide for expansion and contraction movements of either without disturbing or impairing the insulation on the conduit or injuring the pipe assembly.

Another object of the invention resides in the provision of a supporting device for the conduit which is entirely neutral to electrolysis and tuberculation and highly resistant to all forms of soil corrosion, chemical or electrochemical, and such other deteriorating elements as acid-water conditions, hydrogen sulphate gas, and the like, frequently existent in various soils.

Yet another object of the invention is manifest in the provision of a supporting device which is circular in form, conforming in contour to the interior of the pipe employed, and which is capable of guiding the steel pipe against thermal expansion thrusts in any direction in positions up to 360 degrees, providing for the free movement of the conduit within the outer casing without rupture or impairment of the joints.

An important object of the invention is that of providing a support for a co-axial conduit which is simple in design and capable of rigid connection with the steel conduit yet possessing properties which render it capable of resisting the deteriorating effects of high temperatures, electrolysis, and the like, while separating the co-axial arrangement of pipes.

Broadly, the invention seeks to comprehend the provision of a refractory support which can be installed at intervals along the length of a fluid conduit and connected directly thereto without interfering with the normal arrangement of insulating materials thereon and insuring at all times a dependable medium for co-axially spacing the pipes in various conditions of installation and temperature changes.

While the foregoing objects are paramount, other and lesser objects will become manifest as the description proceeds taken in connection with the appended drawings wherein:

Figure 1 is a lateral cross-sectional illustration of the casing and the co-axial conduit, showing the invention in elevation attached to the conduit.

Figure 2 fragmentarily illustrates, in cross-section taken on lines 2—2 of Figure 1, a joint in the outer casing and shows the invention, in cross-section, connected to the conduit.

Figure 3 illustrates the invention in elevation showing the embedded steel plate in dotted lines.

Figure 4 illustrates the invention in cross-section taken on lines 4—4 of Figure 3.

Figure 5 shows in plan a corner detail installation, of a system embodying the invention.

Figure 6 is a sectional detail of the system taken on lines 6—6 of Figure 7.

Figure 7 is a plan view of a corner detail of the system taken on lines 7—7 of Figure 6.

Figure 8 illustrates an anchor detail of the conduit and outer casing in a typical installation.

Figure 9 is a longitudinal cross-sectional illustration of the anchor detail shown in Figure 8.

Figure 10 illustrates a typical installation of the system, shown in plan, in which an expansion loop pit is installed.

Figure 11 is a profile illustration of the installation shown in Figure 10.

Figure 12 illustrates, in plan, an expansion loop pit installation, as shown in Figures 10 and 11.

Figure 13 is a vertical cross-sectional view of the typical expansion loop pit installation taken on lines 13—13 of Figure 12, and Figure 14 illustrates, in vertical section, the arrangement of the steam and return installation, takes on lines 14—14 of Figure 10.

The invention, designed to be employed in a typical installation, such as that illustrated in Figures 5 through 14, comprises a substantially circular member 10, shown in detail in Figures 1, 2, 3 and 4, which is preferably of a high tensile castable refractory material capable of withstanding high or low temperatures and not subject to fracture under extremely high pressures. The thickness of the member 10 is dependent upon the conditions under which it is employed and upon its diameter or the diameter of the pipe in which it is to be installed.

The member 10 is formed with a central circular opening 11 and has a plurality of recesses 12 spaced about its periphery, as shown particularly in Figures 1 and 3, so that one of the recesses 12 will be positioned at the bottom, as in Figure 1, to provide a drain passage 12' within the outer pipe or casing 13. Cast integral with the member 10 is a rectangular plate 14 having a central circular opening 15 which registers with the opening 1 of the member 10 and by which the latter is attached to the inner pipe or conduit 16, by welding 17, or the like, to afford a rigid association between the member 10 and the conduit 16. The outline of the plate 14 is shown in dotted lines in Figures 1 and 3 which also shows the bonding holes 18 which may be provided if desired.

As will be observed, by reference to Figures 2 and 4, the member 10 is formed with bevelled surfaces $a$ within the opening 11 which slope outwardly on each side of the plate 14 to provide sufficient space around the opening to admit a welding torch for performing the welding operation at 17. The annular spaces 19 resulting between the surfaces $a$ and the conduit 16 are filled with a damp mixture of a suitable composition, such as 85% magnesia cement, as shown in detail in Figure 2.

It is contemplated that any desired member of the supporting members 10 be provided and properly spaced along the length of the conduit 16 in the manner described. The installation of the conduit 16 is more readily accomplished by preparing the same in convenient sections which can be easily inserted into the outer casing 13 which is also prepared in convenient sections and temporarily blocked up in the trench. The outer casing 13 is preferably of type known as pressure pipe and is of cement-asbestos construction, obtainable in conventional lengths of 13 feet, with coupling 19 and suitable gaskets 20, effectively sealing the outside, or ground water, from the interior of the casing 13.

After the insulation 21 is applied to the conduit 16 between the support members 10 an asbestos felt jacket is applied to the surface and coated with an asphalt composition. The outer casing 13 may be slipped on over the supports 10 and the couplings 19 pulled in place. Temporary supports are removed and the casing set on grade in the sand cushion in the bottom of the trench, as shown in Figure 14, and the trench is backfilled and tamped.

Referring to Figures 1, 2, 3 and 4, it will be noted that the member 10 is peripherally bevelled at b around each edge to permit the longitudinal movement of the conduit 16 and the casing 13 with respect to each other as these members are assembled. The diameter of the supporting members 10 will, of course, vary in accordance with the internal diameters of the outer casing 13 employed and sufficient tolerances are provided around the members 10 to permit of free longitudinal movement without undue lateral movement, the prime object of the supports 10 being to properly space the conduit 16 from the inner walls of the casing 13 at all times and in any angle or bend of these pipes.

The openings 12, which result by reason of the recesses in the member 10, as apparent in Figure 1, provide communication longitudinally of the casing 13, in the annular space 22 around the conduit 16 for the passage of air. The bottom opening 12' provides a drain for condensation liquids which may occur during warming up periods or in normal operation of the system.

Figures 5 through 14 illustrate several phases of the installation of the system and are not contemplated as a part of the invention herein described. The system contemplates the use of both steam conduits and returns, each of which include the use of the invention. Figures 5, 6 and 7 show two forms of corner installations while Figures 8 and 9 illustrate one method of anchoring the casing and conduit assembly as in the arrangement shown in Figures 10 and 11 which illustrate, diagrammatically, a typical installation in which is included a corner arrangement 23, an anchor assembly 24, an expansion loop pit 25, also including the anchor assembly 24, and a drip and trap pit 26. Figures 12 and 13 illustrate the preferred arrangement of the expansion loop pit 25 which may be provided with a cover 27 either above or below ground, as indicated in dotted lines in Figures 11 and 13.

Manifestly, the structure herein shown and described is capable of considerable modification by persons skilled in the art without departing from the spirit of the invention or the scope of the appended claims.

What is claimed is:

1. In a steam or liquid conduit having a casing, a support for the said conduit concentrically and slidably supporting the same in the said casing, the said support comprising a circular refractory member having a substantial bearing on the inner walls of said casing and having a rigid connection with the said conduit, and a series of peripheral recesses formed therein providing longitudinal communication through the resulting annular space in said casing.

2. In a conduit for steam or liquid having a co-axial casing, a refractory support for the said conduit slidably conforming to the interior walls of the said casing and having spaced peripheral recesses thereon providing communication longitudinally through said casing, and means comprising a plate attached to said conduit forming a part of the said support for rigidly securing the same to the said conduit.

3. In steam or liquid conduit having a co-axial casing and suitably insulated, in combination, a circular support for the said conduit slidably spacing the same concentrically of the said casing, the said support formed from a refractory material and having a metal plate embedded therein and forming a part thereof providing for rigid attachment of said plate to the said conduit, and spaced peripheral recesses in said support providing fluid communication longitudinally of said casing around the said conduit.

4. In an underground conduit for steam, or the like, having a co-axial casing, a circular refractory support for the said conduit concentrically spacing the same within the said casing and having spaced peripheral recesses forming passages within the said casing about the said conduit, and a metal plate embedded in the said support providing means for rigidly associating the same with the said conduit whereby the latter is capable of limited longitudinal movement in said casing.

5. In an underground conduit for steam, or the like, having a co-axial casing, a circular support formed from a refractory material slidably conformable to and supporting the said conduit within the said casing, means comprising a steel plate in the said support providing a rigid connection for the latter with the said conduit and peripheral recesses in the said support providing for fluid passages in said casing exteriorly of said conduit.

6. In a steam or liquid conduit having a co-axial casing, means concentrically supporting the said conduit within the said casing, the said means comprising a circular refractory bearing member slidably engaging the inner walls of the said casing and having a plate forming a part thereof having a rigid connection with the said conduit, and a plurality of peripheral recesses in the said circular member providing longitudinal fluid passages thereby within the said casing.

WILLIAM J. WHATLEY.

REFERENCES CITED

The following references are of record in the file of this patent:

UNITED STATES PATENTS

| Number | Name | Date |
| --- | --- | --- |
| 247,432 | Strohm | Sept. 20, 1881 |
| 2,360,067 | McLeish | Oct. 10, 1944 |
| 2,451,146 | Baker et al. | Oct. 12, 1948 |